United States Patent
Gu et al.

(10) Patent No.: US 10,434,520 B2
(45) Date of Patent: Oct. 8, 2019

(54) COLLECTOR FOR BENEFICIATING CARBONACEOUS PHOSPHATE ORES

(71) Applicant: Arr-Maz Products, L.P., Mulberry, FL (US)

(72) Inventors: Zhengxing Gu, Mulberry, FL (US); Guoxin Wang, Lakeland, FL (US); Yu Xiong, Lakeland, FL (US)

(73) Assignee: Arr-Maz Products, L.P., Mulberry, FL (US)

( * ) Notice: Subject to any disclaimer, the term of this patent is extended or adjusted under 35 U.S.C. 154(b) by 0 days.

(21) Appl. No.: 15/672,891

(22) Filed: Aug. 9, 2017

(65) Prior Publication Data

US 2018/0043373 A1    Feb. 15, 2018

Related U.S. Application Data

(60) Provisional application No. 62/374,523, filed on Aug. 12, 2016.

(51) Int. Cl.
| | | |
|---|---|---|
| *B03D 1/02* | (2006.01) | |
| *B03D 1/008* | (2006.01) | |
| *C01B 25/41* | (2006.01) | |
| *C01B 25/42* | (2006.01) | |
| *C01F 11/18* | (2006.01) | |
| *C11D 1/14* | (2006.01) | |
| *B01D 21/00* | (2006.01) | |
| *B03D 1/012* | (2006.01) | |
| *B03D 1/014* | (2006.01) | |
| *C01B 25/01* | (2006.01) | |

(52) U.S. Cl.
CPC ......... *B03D 1/008* (2013.01); *B01D 21/0006* (2013.01); *B03D 1/012* (2013.01); *B03D 1/014* (2013.01); *B03D 1/021* (2013.01); *C01B 25/01* (2013.01); *C01B 25/41* (2013.01); *C01B 25/425* (2013.01); *C01F 11/18* (2013.01); *C11D 1/14* (2013.01); *B03D 2201/02* (2013.01); *B03D 2203/06* (2013.01)

(58) Field of Classification Search
USPC .................................................. 209/166, 167
See application file for complete search history.

(56) References Cited

U.S. PATENT DOCUMENTS

| | | | |
|---|---|---|---|
| 2,442,455 A * | 6/1948 | Booth | ..................... B03D 1/012 |
| | | | 209/166 |
| 3,113,838 A * | 12/1963 | Perri | ...................... B03D 1/021 |
| | | | 209/166 |
| 3,462,016 A | 8/1969 | Bushell et al. | |
| 3,462,017 A | 8/1969 | Bushell et al. | |
| 3,635,337 A | 1/1972 | Mercade et al. | |
| 3,674,804 A | 7/1972 | Redmore | |
| 3,716,569 A | 2/1973 | Welge et al. | |
| 3,720,498 A | 3/1973 | Redmore | |
| 3,751,371 A | 8/1973 | Welge et al. | |
| 3,779,912 A | 12/1973 | Redmore et al. | |
| 3,807,556 A * | 4/1974 | Johnston | ................ B03D 1/021 |
| | | | 209/166 |
| 3,816,153 A | 6/1974 | Zentz | |
| 3,816,184 A | 6/1974 | Redmore et al. | |
| 3,819,647 A | 6/1974 | Foley | |
| 3,856,563 A | 12/1974 | Zentz | |
| 3,859,211 A | 1/1975 | Redmore | |
| 3,911,093 A | 10/1975 | Sherif et al. | |
| 3,954,761 A | 5/1976 | Redmore | |
| 4,144,969 A | 3/1979 | Snow | |
| 4,172,029 A | 10/1979 | Hefner, Jr. | |
| 4,189,103 A | 2/1980 | Lawver et al. | |
| 4,364,824 A | 12/1982 | Snow | |
| 4,372,843 A | 2/1983 | Lawver et al. | |

(Continued)

FOREIGN PATENT DOCUMENTS

| CA | 1146897 A | 5/1983 |
|---|---|---|
| CA | 1237689 A | 6/1988 |

(Continued)

OTHER PUBLICATIONS

International Search Report and Written Opinion from Corresponding PCT Patent Application PCT/US2017/046297 dated Dec. 27, 2017; Korean Intellectual Property Office.

*Primary Examiner* — Thomas M Lithgow
(74) *Attorney, Agent, or Firm* — Head, Johnson, Kachigian & Wilkinson, PC

(57) ABSTRACT

The invention is related to a flotation process using an improved collector to remove alkaline earth metal carbonate impurities from phosphate ores. The flotation feed may be conditioned with the improved carbonate collector at acidic pH, and subjected to a reverse flotation. The cell overflow may be collected as waste in which carbonate minerals dominate, and the cell underflow may be the phosphate concentrate. The collector may be a combination of chemicals, comprising: (1) any kind of fatty acids, either conventional fatty acid, saponified fatty acid, or modified fatty acid; (2) chemicals with sulfonate or sulfate groups, such as dodecylbenzene sulfonic acid (DDBSA) or its salt, sodium dodecyl sulfate (SDS), sodium lauryl sulfate (SLS), sodium coco sulfate (SCS), etc.; and (3) phosphorous-bearing chemicals, such as sodium tripolyphosphate (STPP), sodium hexametaphosphate (SFMP), trisodium phosphate (TSP), Tetrasodiumpyrophosphate (TSPP), etc. With the improved collector, the separation selectivity and phosphate recovery may be significantly improved.

35 Claims, No Drawings

(56) References Cited

U.S. PATENT DOCUMENTS

| | | | |
|---|---|---|---|
| 4,514,290 A * | 4/1985 | Swiatkowski | B03D 1/01 |
| | | | 209/166 |
| 4,568,454 A | 2/1986 | Mehrotra et al. | |
| 4,600,505 A | 7/1986 | Mair et al. | |
| 4,737,273 A | 4/1988 | Snow | |
| 4,814,069 A | 3/1989 | Moudgil et al. | |
| 4,830,634 A | 5/1989 | Oder | |
| 4,863,512 A | 9/1989 | Banyai et al. | |
| 4,919,711 A | 4/1990 | Banyai et al. | |
| 5,057,209 A | 10/1991 | Klimpel et al. | |
| 5,171,427 A * | 12/1992 | Klimpel | B03D 1/012 |
| | | | 162/5 |
| 5,223,463 A | 6/1993 | Bilimoria et al. | |
| RE34,486 E | 12/1993 | Waldmann | |
| 5,603,411 A | 2/1997 | Williams et al. | |
| 5,753,029 A | 5/1998 | Gantt et al. | |
| 6,041,939 A | 3/2000 | Shi et al. | |
| 6,921,520 B2 | 7/2005 | Barber | |
| 7,494,541 B2 | 2/2009 | Mathur et al. | |
| 7,772,421 B2 | 8/2010 | Yang et al. | |
| 8,071,674 B2 | 12/2011 | Yang et al. | |
| 8,377,312 B2 | 2/2013 | Domke et al. | |
| 8,501,860 B2 | 8/2013 | Yang et al. | |
| 8,501,865 B2 | 8/2013 | Yang et al. | |
| 8,501,983 B2 | 8/2013 | Yang et al. | |
| 8,505,631 B2 | 8/2013 | Yang et al. | |
| 8,507,624 B2 | 8/2013 | Yang et al. | |
| 8,557,037 B2 | 10/2013 | Patel et al. | |
| 8,637,624 B2 | 1/2014 | Yang et al. | |
| 8,931,852 B2 | 1/2015 | Enkhbold et al. | |
| 9,005,592 B2 | 4/2015 | Yang et al. | |
| 2002/0010123 A1 | 1/2002 | Schmiedel et al. | |
| 2002/0170849 A1 | 11/2002 | Krofchak et al. | |
| 2004/0067187 A1 | 4/2004 | Barber | |
| 2004/0106534 A1 | 6/2004 | Nitsch et al. | |
| 2005/0194292 A1 | 9/2005 | Beetge et al. | |
| 2005/0244493 A1 | 11/2005 | Withiam et al. | |
| 2006/0047047 A1 | 3/2006 | Patel et al. | |
| 2006/0086289 A1 | 4/2006 | Mathur et al. | |
| 2006/0270563 A1 | 11/2006 | Yang et al. | |
| 2007/0196474 A1 | 8/2007 | Withiam et al. | |
| 2009/0025612 A1 | 1/2009 | Patel et al. | |
| 2010/0273683 A1 | 10/2010 | Yang et al. | |
| 2011/0240527 A1 | 10/2011 | Domke et al. | |
| 2012/0116005 A1 | 5/2012 | Yang et al. | |
| 2012/0116040 A1 | 5/2012 | Yang et al. | |
| 2012/0121523 A1 | 5/2012 | Yang et al. | |
| 2012/0123149 A1 | 5/2012 | Yang et al. | |
| 2013/0099552 A1 | 4/2013 | Enkhbold et al. | |
| 2013/0129647 A1 | 5/2013 | Yang et al. | |
| 2013/0296516 A1 | 11/2013 | Yang et al. | |
| 2014/0099276 A1 | 4/2014 | Yang et al. | |
| 2015/0184069 A1 | 7/2015 | Nuutinen et al. | |

FOREIGN PATENT DOCUMENTS

| | | | |
|---|---|---|---|
| CA | 1251874 A | | 3/1989 |
| CA | 1279418 C | | 1/1991 |
| CA | 1291153 C | | 10/1991 |
| CA | 1308727 C | | 10/1992 |
| CA | 1326581 C | | 1/1994 |
| CA | 2384286 A1 | | 11/2002 |
| CA | 2722560 A1 | | 11/2009 |
| CN | 103056036 A | * | 4/2013 |
| EP | 0297553 A1 | | 1/1989 |
| EP | 1765933 B1 | | 8/2008 |
| EP | 1791914 B1 | | 10/2013 |
| GB | 858690 A | | 1/1961 |
| GB | 1390410 A | | 4/1975 |
| GB | 1591528 A | | 6/1981 |
| RU | 2271870 C2 | | 3/2006 |
| SE | 326417 B | * | 7/1970 |
| SU | 1630850 A | * | 2/1991 |
| WO | 2005028592 A1 | | 3/2005 |
| WO | 2012101478 A1 | | 8/2012 |
| WO | 2013019627 A1 | | 2/2013 |
| WO | 2014009445 A1 | | 1/2014 |
| WO | 2014176419 A1 | | 10/2014 |
| WO | 2015086815 A1 | | 6/2015 |
| WO | 2015104324 A1 | | 7/2015 |

* cited by examiner

COLLECTOR FOR BENEFICIATING CARBONACEOUS PHOSPHATE ORES

CROSS REFERENCE

This application is based on and claims priority to U.S. Patent Application No. 62/374,523 filed Aug. 12, 2016.

BACKGROUND OF THE INVENTION

Field of the Invention

This invention relates generally to a flotation process for removing carbonate impurities from phosphate ores and more particularly, but not by way of limitation, to a froth flotation process utilizing a novel collector and the collector itself.

Description of the Related Art

The phosphate fertilizer industry currently consumes about 90% of the phosphate concentrate produced worldwide. Thus, increasing agricultural output to meet the needs of a continuously growing world population requires long term growth of phosphate production. With the depletion of high quality siliceous phosphate resources, the phosphate industry has to mine low grade, high impurity phosphate ores to meet the demands worldwide in the future.

Among the impurities associated with phosphate rocks, in addition to silica and clays, calcium and magnesium carbonates are considered the most problematic because of the similarities of physical and chemical properties, such as (1) oxide minerals with same or similar cationic ions, (2) finely disseminated with phosphate, (3) close specific gravity, (4) similar behavior in conventional fatty acid flotation, etc. In fact, most phosphate reserves in the world are associated with high carbonate minerals, including deposits in China, Morocco, Saudi Arabia, Tunisia, Israel, Mongolia, Kazakhstan, USA, etc.

Among the technologies for processing phosphate ores, flotation is the approach most widely applied in the phosphate industry. The success of flotation separation largely depends on the usage of chemical reagents to control the surface behavior of the minerals in the ore and aqueous chemistry in the system. Therefore, the development of reagents, particularly collectors, is the key for achieving satisfactory separation performance through flotation process. Usually for wet process phosphoric acid production, a concentrate with at least 29.5% $P_2O_5$ is necessary for production efficiency.

Reverse flotation for removing alkaline earth metal carbonate impurities, such as dolomite and calcite, is widely practiced in beneficiating high carbonate impurity phosphate ores. For carbonate flotation, different carbonate collectors, such as fatty acids, saponified fatty acids, modified fatty acid, phosphate ester, etc. have been used. The problems with current carbonate flotation include high reagent consumption, less effectiveness on calcite removal, stability and voluminosity of foams during production, etc. The flowsheet varies depending on the characteristics of ore bodies and the requirements of the phosphate concentrate products, including single step reverse flotation, rougher flotation with several step scavenger flotation, or rougher-cleaner-scavenger combination.

Based on the foregoing, it is desirable to provide a new carbonate collector and a method of beneficiating phosphate ores containing carbonate mineral impurities using the new carbonate collector.

It is further desirable for the newly developed collector to generate much higher $P_2O_5$ concentrate grades with good selectivity as compared to that of commonly used collectors.

It is further desirable for the newly developed collector to make phosphate depressant unnecessary.

SUMMARY OF THE INVENTION

In general, in a first aspect, the invention relates to a collector for beneficiating carbonaceous phosphate ores comprising a fatty acid, a chemical with sulfonate or sulfate groups, and a phosphorous-bearing chemical. In particular, the collector may comprise: a majority fatty acid comprising conventional fatty acid, saponified fatty acid, or modified fatty acid; approximately 0.5% to 20% chemical with sulfonate or sulfate groups comprising dodecylbenzene sulfonic acid (DDBSA) or salt, sodium dodecyl sulfate (SDS), sodium lauryl sulfate (SLS), or sodium coco sulfate (SCS); and a balance of phosphorous-bearing chemical comprising sodium tripolyphosphate (STPP), pyrophosphoric acid, sodium phosphate, or sodium pyrophosphate.

The fatty acid may comprise conventional fatty acid, saponified fatty acid, or modified fatty acid. The fatty acid may not be linear. In particular, the fatty acid may not be selected from the group consisting of the alkali metal salts of sulfonated linear fatty acids having a straight carbon chain from about eight to twenty-two carbons and a direct carbon to sulfur bond. The fatty acid may be a monomer.

The chemical with sulfonate or sulfate groups may comprise dodecylbenzene sulfonic acid (DDBSA) or salt, sodium dodecyl sulfate (SDS), sodium lauryl sulfate (SLS), or sodium coco sulfate (SCS). The phosphorous-bearing chemical may comprise sodium tripolyphosphate (STPP), pyrophosphoric acid, sodium phosphate, or sodium pyrophosphate.

The fatty acid may comprise a majority of the collector. The chemical with sulfonate or sulfate groups may comprise 0.5% to 20% of the collector.

In a second aspect, the invention relates to an ore beneficiation process for separating alkaline earth metal carbonate impurities from phosphate ore, the process comprising: pulping ore with water to about 20% to 60% solids to produce an ore slurry; reagentizing the ore slurry to produce a reagentized slurry by adding a pH modifier such that the ore slurry has a pH of about 4 to about 6 and the collector described above; subjecting the reagentized slurry to flotation to produce an overflow and an underflow; separating the overflow as waste; and collecting the underflow as phosphate concentrate. Reagentizing may not include introducing a separate phosphate depressant. The pH modifier may comprise $H_3PO_4$, $H_2SO_4$, a mixture of $H_3PO_4$ and $H_2SO_4$, or other acids that lower pH. The fatty acid, the chemical with sulfonate or sulfate groups, and the phosphorous-bearing chemical of the collector may be added separately. Alternately, the fatty acid, the chemical with sulfonate or sulfate groups, and the phosphorous-bearing chemical of the collector may be combined before being added to the ore slurry.

In a third aspect, the invention relates to a flotation method for removing carbonate impurities from phosphate ores, the method comprising: producing an ore slurry comprising phosphate ore and the collector described above; and subjecting the ore slurry to flotation. The ore slurry may further comprise a pH modifier such that the ore slurry has a pH of about 4 to about 6. The pH modifier may comprise $H_3PO_4$, $H_2SO_4$, a mixture of $H_3PO_4$ and H2SO4, or other acids that lower pH. The ore slurry may further comprise water such that the ore slurry has about 20% to 60% solids prior to introducing the collector. The ore slurry may not comprise a separate phosphate depressant. Subjecting the ore slurry to flotation may produce an underflow and an overflow, and the method may further comprise separating the overflow as waste and collecting the underflow as phosphate concentrate. The fatty acid, the chemical with sulfonate or sulfate groups, and the phosphorous-bearing chemical of the collector may be added separately to the ore slurry or may be combined before being added to the ore slurry.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a novel collector for use in a flotation process for removing carbonate impurities from phosphate ores and the process itself. The collector may be a combination of chemicals, including: (1) one or more fatty acid products, such as conventional fatty acid, saponified fatty acid, modified acid, etc.; (2) one or more phosphorous-bearing chemicals, such as pyrophosphoric acid, sodium phosphate, sodium pyrophosphate, sodium tripolyphosphate (STPP), etc.; and (3) one or more chemicals with sulfonate or sulfate groups, such as dodecylbenzene sulfonic acid (DDBSA) or salt, sodium coco sulfate (SCS), sodium dodecyl sulfate (SDS), sodium lauryl sulfate (SLS), etc. These components may be mixed together as one product, or may be added separately but generally at the same time, either simultaneously or sequentially, at the conditioning step prior to flotation.

The one or more fatty acid products may comprise a majority of the collector. The collector may further comprise approximately 0.5% to 20% chemical with sulfonate or sulfate groups, or more particularly 2% to 20% chemical with sulfonate or sulfate groups. The one or more phosphorous-bearing chemicals may make up the balance of the collector, preferably totaling 0% to 10% of the collector.

In particular, the chemical with sulfonate or sulfate groups may be dodecylbenzene sulfonic acid (DDBSA) or salt. DDBSA may not work as a collector when used alone, but surprisingly may be effective when used in combination with a fatty acid product and a phosphorous-bearing chemical. The fatty acid product may be linear. Alternately, the fatty acid may not be linear. More particularly, the collector may not be selected from the group consisting of the alkali metal salts of sulfonated linear fatty acids having a straight carbon chain from about eight to twenty-two carbons and a direct carbon to sulfur bond. In particular, the fatty acid may be a monomer, which may be a cyclic and branched fatty acid.

With the new collector, a phosphate depressant for effectively floating carbonates may not be necessary. Thus, the collector and the process may exclude a phosphate depressant.

The new collector may float carbonate minerals from phosphate in acidic pH with either $H_3PO_4$, $H_2SO_4$, a mixture of $H_3PO_4$ and $H_2SO_4$, one or more acids that can lower pH, or a combination thereof in any ratio as a pH modifier, and may significantly improve separation efficiency with better recovery and selectivity. All three of the fatty acid, phosphorous-bearing chemicals, and chemicals with sulfonate or sulfate groups may be required, and lack of any one of these three categories of chemicals may cause inefficiency of the beneficiation of carbonates from phosphates. Either phosphorous-bearing chemicals or chemicals with sulfonate or sulfate groups individually, without the other, may not be effective as a flotation collector.

The process may begin with pulping phosphate ore with water to about 20% to 60% solids. Next, the resulting ore slurry may be reagentized by adding a pH modifier to adjust the pH of the slurry to about 4 to 6 and the collector discussed above. Next, the reagentized slurry may be subjected to flotation. The overflow of the flotation may be separated as waste, which may contain a major amount of alkaline metal carbonate impurities. The underflow may be collected as phosphate concentrate.

EXAMPLES

The present invention is further illustrated by the following examples. In order that those skilled in the field may better understand how the present invention can be practiced, the following examples are given by way of illustration only and not necessarily by way of limitation.

Example I

A phosphate ore containing high carbonate mineral impurities was used in all examples. The sample was ground and sized to prepare a minus 48 plus 400 mesh flotation feed. The feed sample was conditioned in a conditioning tank with a carbonate mineral collector at pH 4.5-5.5 using $H_3PO_4$ as pH modifier for one minute. The conditioned slurry was transferred to a flotation cell, and aerated for flotation. During conditioning and flotation, pH was maintained by adding diluted acid. In this example, a saponified fatty acid 813A was used. When 1 kg saponified fatty acid 813A per ton of feed was used alone as a collector, a phosphate concentrate containing 26.2% $P_2O_5$ was obtained from a feed of 21.83% $P_2O_5$ at 92.04% recovery. When 90% 813A and 10% DDBSA were blended as a collector, the $P_2O_5$ grade in the concentrate was increased to 29.84% at 76.17% recovery. When a mixture of 85% 813A, 10% DDBSA, and 5% STPP was used a collector, a phosphate concentrate with 30.42% $P_2O_5$ was achieved at 90.17% recovery. It can be seen that DDBSA improved the $P_2O_5$ grade in the concentrate, but lost selectivity and $P_2O_5$ recovery, while DDBSA and STPP together significantly improved both $P_2O_5$ grade and selectivity.

TABLE I

| Collector | Dosage kg/t | Flotation pH | Product | Yield % | Grade $P_2O_5$ % | Recovery % |
|---|---|---|---|---|---|---|
| 813A | 1.0 | 4.5-5.5 | Concentrate | 76.70 | 26.20 | 92.04 |
|  |  |  | Tail | 23.30 | 7.46 | 7.96 |
|  |  |  | Feed | 100.00 | 21.83 | 100.00 |
| 90% 813A + 10% DDBSA | 1.0 | 4.5-5.5 | Concentrate | 55.49 | 29.84 | 76.17 |
|  |  |  | Tail | 44.51 | 11.64 | 23.83 |
|  |  |  | Feed | 100.00 | 21.74 | 100.00 |
| 85% 813A + 10% DDBSA + 5% STPP | 1.0 | 4.5-5.5 | Concentrate | 64.82 | 30.42 | 90.17 |
|  |  |  | Tail | 35.18 | 6.11 | 9.83 |
|  |  |  | Feed | 100.00 | 21.87 | 100.00 |

Example II

In the tests comprising this example, the flotation feed and flotation procedures were the same as that outlined in Example I, except that another saponified fatty acid, 813D, was used. In this example, $H_3PO_4$ was used as the pH modifier. When 1.5 kg saponified fatty acid 813D per ton of feed was used alone as a collector, a phosphate concentrate containing 27.42% $P_2O_5$ was obtained from a feed of 21.64% $P_2O_5$ at 90.44% recovery. When 10% DDBSA was blended into the 813D as a collector, the $P_2O_5$ grade in the concentrate was increased to 32.26% at 85.76% recovery. When a combination of 85% 813D, 10% DDBSA, and 5% STPP was used as a collector, a phosphate concentrate with 32.37% $P_2O_5$ was achieved at 86.69% recovery. It can be observed that the combination of 813D, DDBSA, and STPP as collector improved both $P_2O_5$ grade in the concentrate and selectivity of the separation.

TABLE II

| Collector | Dosage kg/t | Flotation pH | Product | Yield % | Grade $P_2O_5$ % | Recovery % |
|---|---|---|---|---|---|---|
| 813D | 1.5 | 4.5-5.5 | Concentrate | 71.38 | 27.42 | 90.44 |
|  |  |  | Tail | 28.62 | 7.23 | 9.56 |
|  |  |  | Feed | 100.00 | 21.64 | 100.00 |
| 90% 813D + 10% DDBSA | 1.5 | 4.5-5.5 | Concentrate | 57.87 | 32.26 | 85.76 |
|  |  |  | Tail | 42.13 | 7.36 | 14.24 |
|  |  |  | Feed | 100.00 | 21.77 | 100.00 |
| 85% 813D + 10% DDBSA + 5% STPP | 1.5 | 4.5-5.5 | Concentrate | 57.70 | 32.37 | 86.69 |
|  |  |  | Tail | 42.30 | 6.78 | 13.31 |
|  |  |  | Feed | 100.00 | 21.55 | 100.00 |

Example III

In this example, a different saponified fatty acid, F40A, was selected as a collector, and $H_3PO_4$ as the pH modifier. When saponified fatty acid F40A was used alone, there was no float at 1.5 kg per ton of feed. After it was mixed with 10% DDBSA and 5% STPP as a collector, a phosphate concentrate containing 30.9% was obtained at 90.79% recovery.

TABLE III

| Collector | Dosage kg/t | Flotation pH | Product | Yield % | Grade $P_2O_5$ % | Recovery % |
|---|---|---|---|---|---|---|
| F40A | 1.0 | 4.5-5.5 | No float |  |  |  |
| 90% F40A + 10% DDBSA | 1.0 | 4.5-5.5 | Concentrate | 69.52 | 28.44 | 92.14 |
|  |  |  | Tail | 30.48 | 5.53 | 7.86 |
|  |  |  | Feed | 100.00 | 21.46 | 100.00 |
| 85% F40A + 10% DDBSA + 5% STPP | 1.0 | 4.5-5.5 | Concentrate | 63.52 | 30.90 | 90.79 |
|  |  |  | Tail | 36.48 | 5.46 | 9.21 |
|  |  |  | Feed | 100.00 | 21.62 | 100.00 |

Example IV

In this example, the collector, MS, which is mixed fatty acid sodium salt (FA soap), was used at a low dosage, specifically 0.5 kg per ton of feed. $H_3PO_4$ was used to maintain conditioning and flotation pH around 5.3. Pure FA soap did not work well at this low dosage, resulting in a concentrate of 24.41% $P_2O_5$. DDBSA by itself did not work either. Adding DDBSA significantly improved $P_2O_5$ grade of concentrate. By adding both DDBSA and STPP with FA soap together, flotation performance was further improved.

TABLE IV

| Collector | Dosage kg/t | pH | Product | Yield % | $P_2O_5$ % | Recovery % |
|---|---|---|---|---|---|---|
| MS | 0.5 | 4.5-5.5 | Concentrate | 84.33 | 24.41 | 94.70 |
| | | | Tail | 15.67 | 7.35 | 5.30 |
| | | | Feed | 100.00 | 21.74 | 100.00 |
| DDBSA | 0.7 | 4.5-5.5 | Concentrate | 77.10 | 24.43 | 88.08 |
| | | | Tail | 22.90 | 11.13 | 11.92 |
| | | | Feed | 100.00 | 21.38 | 100.00 |
| 90% MS + 10% DDBSA | 0.5 | 4.5-5.5 | Concentrate | 63.16 | 31.16 | 90.44 |
| | | | Tail | 36.84 | 5.65 | 9.56 |
| | | | Feed | 100.00 | 21.76 | 100.00 |
| 80% MS + 20% DDBSA | 0.5 | 4.5-5.5 | Concentrate | 57.68 | 32.66 | 87.45 |
| | | | Tail | 42.32 | 6.39 | 12.55 |
| | | | Feed | 100.00 | 21.54 | 100.00 |
| 70% MS + 20% DDBSA + 10% STPP | 0.5 | 4.5-5.5 | Concentrate | 56.80 | 33.51 | 88.53 |
| | | | Tail | 43.20 | 5.71 | 11.47 |
| | | | Feed | 100.00 | 21.50 | 100.00 |

Example V

In this example, CCS-503, which is sulfonated oleic acid, which contains free fatty acids and sodium salt of fatty acids (FA soap), was used in the collectors. Using CCS-503 alone, as suggested in the prior art, was unsuccessful as it produced a concentrate of 24.35% $P_2O_5$ and resulted in foaming. Likewise, DDBSA by itself did not work, and similarly produced a lot of foam. Adding DDBSA to the CCS-503 improved $P_2O_5$ grade of concentrate. Adding DDBSA and STPP likewise improved concentrate grade and recovery.

TABLE V

| Collector | Dosage kg/t | pH | Product | Yield % | P2O5 % | Recovery % |
|---|---|---|---|---|---|---|
| CCS-503 | 0.7 | 4.5-5.5 | Concentrate | 82.06 | 24.35 | 94.57 |
| | | | Tail | 17.94 | 6.39 | 5.43 |
| | | | Feed | 100.00 | 21.13 | 100.00 |
| DDBSA | 0.7 | 4.5-5.5 | Concentrate | 77.10 | 24.43 | 88.08 |
| | | | Tail | 22.90 | 11.13 | 11.92 |
| | | | Feed | 100.00 | 21.38 | 100.00 |
| 80% CCS-503 + 20% DDBSA | 0.7 | 4.5-5.5 | Concentrate | 60.63 | 30.12 | 86.24 |
| | | | Tail | 39.37 | 7.40 | 13.76 |
| | | | Feed | 100.00 | 21.17 | 100.00 |
| 70% CCS-503 + 20% DDBSA + 10% STPP | 0.5 | 4.5-5.5 | Concentrate | 59.31 | 30.99 | 87.44 |
| | | | Tail | 40.69 | 6.49 | 12.56 |
| | | | Feed | 100.00 | 21.02 | 100.00 |

Example VI

In this example, CCS-503 was used as a collector. Conditioning and flotation pH was maintained around 5.3 using phosphoric acid. Sodium coco sulfate (SCS) and STPP were added to improve carbonate flotation performance. As usual, when CCS-503 was used alone as a collector, it did not work well. Adding SCS to the CCS-503 significantly improved $P_2O_5$ grade of concentrate. When SCS and STPP were added together into CCS-503, the selectivity was further improved, and better recovery was achieved.

TABLE VI

| Collector | Dosage kg/t | pH | Product | Yield % | $P_2O_5$ % | Recovery % |
|---|---|---|---|---|---|---|
| CCS-503 | 0.7 | 4.5-5.5 | Concentrate | 82.06 | 24.35 | 94.57 |
| | | | Tail | 17.94 | 6.39 | 5.43 |
| | | | Feed | 100.00 | 21.13 | 100.00 |
| 95% CCS-503 + 5% SCS | 0.7 | 4.5-5.5 | Concentrate | 50.10 | 33.14 | 78.23 |
| | | | Tail | 49.90 | 9.26 | 21.77 |
| | | | Feed | 100.00 | 21.22 | 100.00 |
| 90% CCS-503 + 5% SCS + 5% STPP | 0.7 | 4.5-5.5 | Concentrate | 60.63 | 33.14 | 81.64 |
| | | | Tail | 39.37 | 8.13 | 18.36 |
| | | | Feed | 100.00 | 21.17 | 100.00 |

Example VII

CustoFloat 620C (CF-620C) is a modified fatty acid, which also contains sulfonated oleic acid and contains sodium salt of fatty acid but more free fatty acids than CCS-503, currently used for reverse flotation of carbonate minerals from phosphate in acidic pH. In this example, CF-620C was used as a collector to demonstrate the effect of adding DDBSA and STPP into CF-620C as a new collector on the performance of carbonate flotation. In the tests comprising this example, the flotation feed and flotation procedures were the same as that outlined in Example I, except that modified fatty acid CF-620C was used. $H_3PO_4$ was used as the pH modifier. When 1 kg CF-620C per ton of feed was used, the concentrate contained 31.37% $P_2O_5$ at 86.77% recovery. With a mixture of CF-620C, DDBSA, and STPP as a collector, a concentrate containing 32.76% $P_2O_5$ was obtained at 89.32% recovery. Both $P_2O_5$ grade and recovery were significantly improved.

TABLE VII

| Collector | Dosage kg/t | Flotation pH | Product | Yield % | Grade $P_2O_5$ % | Recovery % |
|---|---|---|---|---|---|---|
| CF-620C | 1.0 | 4.5-5.5 | Concentrate | 59.36 | 31.37 | 86.77 |
| | | | Tail | 40.64 | 6.99 | 13.23 |
| | | | Feed | 100.00 | 21.46 | 100.00 |
| 85% CF-620C + 10% DDBSA + 5% STPP | 1.0 | 4.5-5.5 | Concentrate | 59.45 | 32.76 | 89.32 |
| | | | Tail | 40.55 | 5.74 | 10.68 |
| | | | Feed | 100.00 | 21.80 | 100.00 |

Example VIII

In previous examples. $H_3PO_4$ was used as pH modifier to adjust acidic pH for reverse flotation of carbonate minerals from phosphate. In this example, same flotation procedures outlined in Example I were employed, and mixed acid of 25% $H_3PO_4$ and 75% $H_2SO_4$ was used as pH modifier to achieve acidic pH for carbonate flotation. With mixed acid as the pH modifier, a concentrate obtained at 1 kg modified fatty acid CF-620C per ton of feed contained only 28.55% $P_2O_5$ at 84.71% recovery. When the blend of CF-620C, DDBSA, and STPP was used as a collector, a concentrate containing 32.16% $P_2O_5$ was achieved at 88.51% recovery.

TABLE VIII

| Collector | Dosage kg/t | Flotation pH | Product | Yield % | Grade $P_2O_5$ % | Recovery % |
|---|---|---|---|---|---|---|
| CF-620C | 1 | 4.5-5.5 | Concentrate | 63.27 | 28.55 | 84.71 |
| | | | Tail | 36.73 | 8.88 | 15.29 |
| | | | Feed | 100.00 | 21.33 | 100.00 |

TABLE VIII-continued

| Collector | Dosage kg/t | Flotation pH | Product | Yield % | Grade $P_2O_5$ % | Recovery % |
|---|---|---|---|---|---|---|
| CF-620C + 20% DDBSA + 10% STPP | 1 | 4.5-5.5 | Concentrate | 58.59 | 32.16 | 88.51 |
| | | | Tail | 41.41 | 5.91 | 11.49 |
| | | | Feed | 100.00 | 21.29 | 100.00 |

Example IX

In this example, $H_2SO_4$ was used as pH modifier to adjust acidic pH for reverse flotation of carbonate minerals from phosphate, and other conditions are the same as in Example V. With $H_2SO_4$ as pH modifier, a concentrate obtained at 1 kg modified fatty acid CF-620C per ton of feed contained only 26.86% $P_2O_5$ at 86.37% recovery. When CF-620C, DDBSA, and STPP were mixed as a collector, a concentrate containing 31.30% $P_2O_5$ was achieved at 89.41% recovery.

TABLE IX

| Collector | Dosage kg/t | Flotation pH | Product | Yield % | Grade $P_2O_5$ % | Recovery % |
|---|---|---|---|---|---|---|
| CF-620C | 1 | 4.5-5.5 | Concentrate | 68.83 | 26.86 | 86.37 |
| | | | Tail | 31.17 | 9.36 | 13.63 |
| | | | Feed | 100.00 | 21.40 | 100.00 |
| CF-620C + 20% DDBSA + 10% STPP | 1 | 4.5-5.5 | Concentrate | 60.72 | 31.30 | 89.41 |
| | | | Tail | 39.28 | 5.73 | 10.59 |
| | | | Feed | 100.00 | 21.26 | 100.00 |

Example X

In example X, a modified fatty acid, CF-620C, was used as a collector to float a different batch of phosphate feed sample containing carbonate impurities. $H_3PO_4$ was used to maintain pH 5.3 for conditioning and flotation. CF-620C at dosage of 0.7 kg/t of feed worked well on this feed. A concentrate containing 32.55% $P_2O_5$ was achieved at 79.26% recovery. Adding DDBSA to CF-620C improved both separation selectivity and $P_2O_5$ recovery. The flotation performance was further improved by mixing CF-620C, DDBSA and STPP together. At the same usage of 0.7 kg/t of feed, the concentrate product containing 33.72% $P_2O_5$ was obtained at 85.62% recovery.

TABLE X

| Collector | Dosage kg/t | pH | Product | Yield % | $P_2O_5$ % | Recovery % |
|---|---|---|---|---|---|---|
| CF-620C | 0.7 | 4.5-5.5 | Concentrate | 51.35 | 32.55 | 79.26 |
| | | | Tail | 48.65 | 8.99 | 20.74 |
| | | | Feed | 100.00 | 21.09 | 100.00 |
| 90% CF-620C + 10% DDBSA | 0.7 | 4.5-5.5 | Concentrate | 53.51 | 33.38 | 82.75 |
| | | | Tail | 46.49 | 8.01 | 17.25 |
| | | | Feed | 100.00 | 21.58 | 100.00 |
| 80% CF-620C + 20% DDBSA | 0.7 | 4.5-5.5 | Concentrate | 52.18 | 33.71 | 82.56 |
| | | | Tail | 47.82 | 7.77 | 17.44 |
| | | | Feed | 100.00 | 21.31 | 100.00 |
| 70% CF-620C + 20% DDBSA + 10% STPP | 0.7 | 4.5-5.5 | Concentrate | 53.78 | 33.72 | 85.62 |
| | | | Tail | 46.22 | 6.59 | 14.38 |
| | | | Feed | 100.00 | 21.18 | 100.00 |

Whereas, the devices and methods have been described in relation to the drawings and claims, it should be understood that other and further modifications, apart from those shown or suggested herein, may be made within the spirit and scope of this invention.

What is claimed is:

1. A collector for beneficiating carbonaceous phosphate ores comprising:
   a fatty acid, where the fatty acid comprises a majority of the collector;
   a chemical with sulfonate or sulfate groups, the chemical with sulfonate or sulfate groups comprising dodecylbenzene sulfonic acid (DDBSA) or salt, sodium dodecyl sulfate (SDS), sodium lauryl sulfate (SLS), sodium coco sulfate (SCS), or a combination thereof, where the chemical with sulfonate or sulfate groups comprises 0.5% to 20% of the collector; and
   a finite, effective amount of a phosphorous-bearing chemical, where the phosphorous-bearing chemical is sodium phosphate, sodium pyrophosphate, sodium tripolyphosphate (STPP), other sodium polyphosphate salt, their partially acidified or fully acidified forms, or a combination thereof.

2. The collector of claim 1 where the fatty acid is not linear.

3. The collector of claim 2 where the fatty acid is not selected from the group consisting of the alkali metal salts of sulfonated linear fatty acids having a straight carbon chain from about eight to twenty-two carbons and a direct carbon to sulfur bond.

4. The collector of claim 1 where the fatty acid is a monomer.

5. The collector of claim 1 where the chemical with sulfonate or sulfate groups is dodecylbenzene sulfonic acid (DDBSA) or salt.

6. An ore beneficiation process for separating alkaline earth metal carbonate impurities from phosphate ore, the process comprising:
  pulping ore with water to about 20% to 60% solids to produce an ore slurry;
  reagentizing the ore slurry to produce a reagentized slurry by adding:
    a pH modifier such that the ore slurry has a pH of about 4 to about 6; and
    a collector comprising:
      a fatty acid, where the fatty acid comprises a majority of the collector;
      a chemical with sulfonate or sulfate groups, the chemical with sulfonate or sulfate groups comprising dodecylbenzene sulfonic acid (DDBSA) or salt, sodium dodecyl sulfate (SDS), sodium lauryl sulfate (SLS), sodium coco sulfate (SCS), or a combination thereof, where the chemical with sulfonate or sulfate groups comprises 0.5% to 20% of the collector; and
      a balance of a phosphorous-bearing chemical, where the phosphorous-bearing chemical is sodium phosphate, sodium pyrophosphate, sodium tripolyphosphate (STPP), other sodium polyphosphate salt, their partially acidified or fully acidified forms, or a combination thereof;
  subjecting the reagentized slurry to flotation to produce an overflow and an underflow;
  separating the overflow as waste; and
  collecting the underflow as phosphate concentrate.

7. The process of claim 6, where reagentizing does not include introducing a separate phosphate depressant.

8. The process of claim 6 where the pH modifier comprises $H_3PO_4$, $H_2SO_4$, a mixture of $H_3PO_4$ and $H_2SO_4$, or other acids that lower pH.

9. The process of claim 6 where the fatty acid, the chemical with sulfonate or sulfate groups, and the phosphorous-bearing chemical of the collector are added separately.

10. The process of claim 6 where the fatty acid, the chemical with sulfonate or sulfate groups, and the phosphorous-bearing chemical of the collector are combined before being added to the ore slurry.

11. The process of claim 6 where the collector comprises:
  a majority fatty acid comprising conventional fatty acid, or a saponified fatty acid;
  approximately 0.5% to 20% chemical with sulfonate or sulfate groups comprising dodecylbenzene sulfonic acid (DDBSA) or salt, sodium dodecyl sulfate (SDS), sodium lauryl sulfate (SLS), or sodium coco sulfate (SCS); and
  a finite, effective amount up to 10% phosphorous-bearing chemical comprising sodium tripolyphosphate (STPP), pyrophosphoric acid, sodium phosphate, or sodium pyrophosphate.

12. The process of claim 6 where the fatty acid comprises conventional fatty acid, or a saponified fatty acid.

13. The process of claim 6 where the fatty acid is not linear.

14. The process of claim 13 where the fatty acid is not selected from the group consisting of the alkali metal salts of sulfonated linear fatty acids having a straight carbon chain from about eight to twenty-two carbons and a direct carbon to sulfur bond.

15. The process of claim 6 where the fatty acid is a monomer.

16. The process of claim 6 where the chemical with sulfonate or sulfate groups comprises dodecylbenzene sulfonic acid (DDBSA) or salt, sodium dodecyl sulfate (SDS), sodium lauryl sulfate (SLS), or sodium coco sulfate (SCS).

17. The process of claim 16 where the chemical with sulfonate or sulfate groups is dodecylbenzene sulfonic acid (DDBSA) or salt.

18. The process of claim 6 where the phosphorous-bearing chemical comprises sodium tripolyphosphate (STPP), pyrophosphoric acid, sodium phosphate, or sodium pyrophosphate.

19. The process of claim 6 where the chemical with sulfonate or sulfate groups comprises 0.5% to 20% of the collector and the chemical with phosphorous-bearing chemicals comprised sodium tripolyphosphate (STPP), pyrophosphoric acid, sodium phosphate, or sodium pyrophosphate comprises a finite, effective amount up to 10% of the collector.

20. A flotation method for removing carbonate impurities from phosphate ores, the method comprising:
  producing an ore slurry comprising phosphate ore and a collector comprising:
    a fatty acid, where the fatty acid comprises a majority of the collector;
    a chemical with sulfonate or sulfate groups, the chemical with sulfonate or sulfate groups comprising dodecylbenzene sulfonic acid (DDBSA) or salt, sodium dodecyl sulfate (SDS), sodium lauryl sulfate (SLS), sodium coco sulfate (SCS), or a combination thereof, where the chemical with sulfonate or sulfate groups comprises 0.5% to 20% of the collector; and
    a finite, effective amount of a phosphorous-bearing chemical, where the phosphorous-bearing chemical is sodium phosphate, sodium pyrophosphate, sodium tripolyphosphate (STPP), other sodium polyphosphate salt, their partially acidified or fully acidified forms, or a combination thereof; and
  subjecting the ore slurry to flotation.

21. The method of claim 20 where the ore slurry further comprises a pH modifier such that the ore slurry has a pH of about 4 to about 6.

22. The method of claim 21 where the pH modifier comprises $H_3PO_4$, $H_2SO_4$, a mixture of $H_3PO_4$ and $H_2SO_4$, or other acids that lower pH.

23. The method of claim 20 where the ore slurry further comprises water such that the ore slurry has about 20% to 60% solids prior to introducing the collector.

24. The method of claim 20 where the ore slurry does not comprise a separate phosphate depressant.

25. The method of claim 20 where subjecting the ore slurry to flotation produces an underflow and an overflow, the method further comprising:
  separating the overflow as waste; and
  collecting the underflow as phosphate concentrate.

26. The method of claim 20 where the fatty acid, the chemical with sulfonate or sulfate groups, and the phosphorous-bearing chemical of the collector are added separately to the ore slurry.

27. The method of claim 20 where the fatty acid, the chemical with sulfonate or sulfate groups, and the phosphorous-bearing chemical of the collector are combined before being added to the ore slurry.

28. The method of claim 20 where the collector comprises:
- a majority fatty acid comprising conventional fatty acid, or a saponified fatty acid;
- approximately 0.5% to 20% chemical with sulfonate or sulfate groups comprising dodecylbenzene sulfonic acid (DDBSA) or salt, sodium dodecyl sulfate (SDS), sodium lauryl sulfate (SLS), or sodium coco sulfate (SCS); and
- a finite, effective amount up to 10% phosphorous-bearing chemical comprising sodium tripolyphosphate (STPP), pyrophosphoric acid, sodium phosphate, or sodium pyrophosphate.

29. The method of claim 20 where the fatty acid comprises conventional fatty acid, or saponified fatty acid.

30. The method of claim 20 where the fatty acid is not linear.

31. The method of claim 30 where the fatty acid is not selected from the group consisting of the alkali metal salts of sulfonated linear fatty acids having a straight carbon chain from about eight to twenty-two carbons and a direct carbon to sulfur bond.

32. The method of claim 20 where the fatty acid is a monomer.

33. The method of claim 20 where the chemical with sulfonate or sulfate groups comprises dodecylbenzene sulfonic acid (DDBSA) or salt, sodium dodecyl sulfate (SDS), sodium lauryl sulfate (SLS), or sodium coco sulfate (SCS).

34. The method of claim 33 where the chemical with sulfonate or sulfate groups is dodecylbenzene sulfonic acid (DDBSA) or salt.

35. The method of claim 20 where the phosphorous-bearing chemical comprises sodium tripolyphosphate (STPP), pyrophosphoric acid, sodium phosphate, or sodium pyrophosphate.

* * * * *